(12) United States Patent
Vuppu et al.

(10) Patent No.: US 8,766,954 B2
(45) Date of Patent: Jul. 1, 2014

(54) ACTIVE STYLUS FOR USE WITH TOUCH-SENSITIVE INTERFACES AND CORRESPONDING METHOD

(75) Inventors: Sandeep Vuppu, Wheeling, IL (US); David Cranfill, Antioch, IL (US); Michael Olley, Lake Zurich, IL (US); Mark Valentine, Kenosha, WI (US)

(73) Assignee: Motorola Mobility LLC, Chicago, IL (US)

( * ) Notice: Subject to any disclaimer, the term of this patent is extended or adjusted under 35 U.S.C. 154(b) by 406 days.

(21) Appl. No.: 12/974,252

(22) Filed: Dec. 21, 2010

(65) Prior Publication Data

US 2012/0154340 A1    Jun. 21, 2012

(51) Int. Cl.
*G06F 3/033*    (2013.01)
(52) U.S. Cl.
USPC .......................... 345/179; 345/174; 178/19.03
(58) Field of Classification Search
CPC ..... G06F 3/03545; G06F 3/038; G06F 3/044; G06F 3/0317; G06F 3/0488
USPC .......... 345/173–179; 178/18.01, 18.06, 19.03
See application file for complete search history.

(56) References Cited

U.S. PATENT DOCUMENTS

| 4,076,428 | A |   | 2/1978  | Otake et al. |         |
|-----------|---|---|---------|--------------|---------|
| 4,654,648 | A |   | 3/1987  | Herrington et al. |    |
| 4,672,154 | A |   | 6/1987  | Rodgers et al. |       |
| 5,528,002 | A | * | 6/1996  | Katabami ...... | 178/19.06 |
| 5,693,914 | A |   | 12/1997 | Ogawa |               |
| 5,828,011 | A | * | 10/1998 | Partow et al. ...... | 178/19.01 |
| 5,913,629 | A |   | 6/1999  | Hazzard |              |
| 6,050,490 | A |   | 4/2000  | Leichner et al. |      |
| 6,133,906 | A |   | 10/2000 | Geaghan |              |
| 6,175,773 | B1 |  | 1/2001  | Reiffel et al. |       |

(Continued)

FOREIGN PATENT DOCUMENTS

| EP | 2065797 A2 | 6/2009 |
| EP | 2159669 A2 | 3/2010 |

(Continued)

OTHER PUBLICATIONS

Patent Cooperation Treaty, "PCT Search Report and Written Opinion of the International Searching Authority" for International Application No. PCT/US2011/065713, Apr. 12, 2012, 14 pages.

(Continued)

*Primary Examiner* — Hong Zhou
(74) *Attorney, Agent, or Firm* — Philip H. Burrus, IV; Sylvia Chen

(57) ABSTRACT

A stylus (100) is configured for actively interacting with a touch-sensitive interface (201) by injecting or sinking charge in response to a touch-detection signal emitted from the touch-sensitive interface (201). One stylus (100) includes a stylus body (104) and a compound tip (105) extending axially from the stylus body (104). The compound tip (105) can include a center electrode (101) that is configured to detect electric field variations from the touch-sensitive interface (201) and a shroud electrode (102) that is concentrically disposed about the center electrode (101). An active circuit (103) coupled between the center electrode (101) and the shroud electrode (102) is configured to apply a gain to the detected electric field variations and to change a potential of the shroud electrode (102) synchronously with the electric field variations detected by the center electrode (101).

19 Claims, 9 Drawing Sheets

(56) References Cited

U.S. PATENT DOCUMENTS

| | | | |
|---|---|---|---|
| 6,396,481 B1 | 5/2002 | Challa et al. | |
| 6,450,721 B1 | 9/2002 | D'Amico et al. | |
| 6,473,072 B1* | 10/2002 | Comiskey et al. | 345/173 |
| 6,550,997 B1 | 4/2003 | King et al. | |
| 6,577,299 B1 | 6/2003 | Schiller et al. | |
| 6,749,354 B2 | 6/2004 | Kageyama et al. | |
| 6,812,685 B2 | 11/2004 | Steber et al. | |
| 6,867,765 B2 | 3/2005 | LeKuch et al. | |
| 7,236,161 B2 | 6/2007 | Geaghan et al. | |
| 7,477,242 B2 | 1/2009 | Cross et al. | |
| 7,483,018 B2 | 1/2009 | Oliver | |
| 7,489,308 B2 | 2/2009 | Blake et al. | |
| 7,528,825 B2* | 5/2009 | Sakurai et al. | 345/179 |
| 7,612,767 B1 | 11/2009 | Griffin et al. | |
| 7,646,377 B2 | 1/2010 | Geaghan | |
| 7,685,538 B2 | 3/2010 | Fleck | |
| 7,719,515 B2 | 5/2010 | Fujiwara et al. | |
| 7,794,167 B2 | 9/2010 | Lapstun et al. | |
| 7,889,186 B2 | 2/2011 | Nishimura et al. | |
| 8,031,177 B2 | 10/2011 | Lapstun et al. | |
| 8,217,918 B2* | 7/2012 | Morag et al. | 345/179 |
| 8,226,315 B1 | 7/2012 | McKinley et al. | |
| 8,253,702 B2* | 8/2012 | Katsurahira et al. | 345/173 |
| 2002/0040817 A1 | 4/2002 | LeKuch et al. | |
| 2003/0118391 A1 | 6/2003 | Adams | |
| 2003/0164821 A1* | 9/2003 | Rezania | 345/179 |
| 2004/0041799 A1* | 3/2004 | Vincent et al. | 345/179 |
| 2004/0201580 A1* | 10/2004 | Fujiwara et al. | 345/179 |
| 2005/0051550 A1 | 3/2005 | Hagano | |
| 2005/0122319 A1* | 6/2005 | Sakurai et al. | 345/179 |
| 2006/0227121 A1 | 10/2006 | Oliver | |
| 2006/0244738 A1 | 11/2006 | Mishimura et al. | |
| 2007/0025805 A1 | 2/2007 | Lapstun et al. | |
| 2007/0146351 A1* | 6/2007 | Katsurahira et al. | 345/179 |
| 2007/0188477 A1* | 8/2007 | Rehm | 345/179 |
| 2008/0030486 A1 | 2/2008 | Cook | |
| 2009/0012806 A1 | 1/2009 | Ricordi et al. | |
| 2009/0027349 A1* | 1/2009 | Comerford | 345/173 |
| 2009/0183929 A1 | 7/2009 | Zhang et al. | |
| 2010/0006350 A1 | 1/2010 | Elias | |
| 2010/0170726 A1* | 7/2010 | Yeh et al. | 178/19.03 |
| 2010/0177121 A1 | 7/2010 | Homma et al. | |
| 2010/0315384 A1 | 12/2010 | Hargreaves et al. | |
| 2011/0193776 A1* | 8/2011 | Oda et al. | 345/157 |
| 2011/0304577 A1* | 12/2011 | Brown et al. | 345/174 |
| 2012/0050207 A1* | 3/2012 | Westhues et al. | 345/174 |
| 2012/0050231 A1 | 3/2012 | Westhues et al. | |
| 2012/0068964 A1 | 3/2012 | Wright et al. | |

FOREIGN PATENT DOCUMENTS

| | | |
|---|---|---|
| JP | 2007-183809 A | 7/2007 |
| WO | 2002058029 A2 | 7/2002 |
| WO | 2011008533 A2 | 1/2011 |

OTHER PUBLICATIONS

Jiri Slaby et al., "Dual Mode Active Stylus for Writing Both on a Capacitive Touchscreen and Paper", U.S. Appl. No. 13/426,860, filed Mar. 22, 2012, 44 pages.

Intellipen, "IntelliPen PRO: Digital Pen & USB Flash Drive", http://www.intellipens.com/?CategoryID=182, 2009, 2 pages.

Fisher Spacepen, "Fisher Bullet Space Pen Stylus w/Clip—Chrome", http://www.styluscentral.com/shopexd.asp?id=200, downloaded from Internet Jun. 11, 2012, 1 page.

Kevin Purcell, "LunaTik Touch Pen Stylus—Ballpoint Pen in an iPad Stylus Tip", GottaBe Mobile: Mobile News & Reviews, www.gottabemobile.com/2011/12/13/lunatik-tough-pen-stylus-ballpoint-pen-in-an-ipad-stylus-tip/#, Dec. 13, 2011, 2 pages.

B&H Foto & Electronics Corp., "Targus 3-in-1 Stylus for Capacitive Devices", www.bhpotovideo.com/c/product/808841-REG/Targus_AMMO4TBUS_3_in_1_Stylus_for_Capacitive.html, downloaded from internet Mar. 20, 2012, 2 pages.

More/Real, "Stylus Caps", http://more-real.com, downloaded from internet Mar. 20, 2012, 3 pages.

Dell Axim x30 Stylus with Ballpoint Pen, http://www.cel-phone-accessories.com/aximx.30.html, 2011, 1 page.

Mark D. Hansen et al., "Touchscreen Writing System", U.S. Appl. No. 13/450,906, filed Apr. 19, 2012, 25 pages.

N-TRIG Ltd., "DuoSense Pen and Multi-Touch Solution" internet brochure, http://www.ntrig.com, downloaded from internet Jun. 11, 2012, 3 pages.

Hardcandy Cases, "CandyStylus+Pen", http://www.hardcandycases.com/candy-ipad-stylus.html, 2011, 2 pages.

Ten One Design LLC, "Pogo Stylus for iPhone & iPod touch", http://tenonedesign.com/stylus.php, 2011, 3 pages.

Dagi Corporation Ltd. "iPad Stylus" electronic catalog page, http://www.dagi.com.tw/front/bin/home.phtml, printed Aug. 23, 2011, 2 pages.

Wacom, "Bamboo User's Manual for Windows & Macintosh", 2009, 90 pages.

Patent Cooperation Treaty, "PCT Search Report and Written Opinion of the International Searching Authority" for International Application No. PCT/US2013/026976, Jun. 11, 2013, 10 pages.

Patent Cooperation Treaty, "PCT Search Report and Written Opinion of the International Searching Authority" for International Application No. PCT/US2013/037273, Jul. 5, 2013, 12 pages.

United States Patent and Trademark Office, "Non-Final Rejection" for U.S. Appl. No. 13/426,860 dated Oct. 28, 2013, 15 pages.

United States Patent and Trademark Office, "Non-Final Rejection" for U.S. Appl. No. 13/450,906, Jan. 13, 2014, 28 pages.

* cited by examiner

ACTIVE STYLUS FOR USE WITH TOUCH-SENSITIVE INTERFACES AND CORRESPONDING METHOD

BACKGROUND

1. Technical Field

This invention relates generally to styluses, and more particularly to styluses configured for operation with touch-sensitive user interfaces.

2. Background Art

Touch-sensitive devices, such as smart phones, portable digital assistants, and tablet-style computers, are becoming increasingly popular. While electronic computing devices of the past traditionally were manufactured with numeric keypads or QWERTY keyboards, an increasing number of devices are being manufactured today exclusively with touch-sensitive screens and touchpads.

Capacitive touch-sensitive devices generally work by emitting a periodic waveform, such as a square wave or sine wave. When an object, like a user's finger for example, comes in close proximity with the surface of the touch-sensitive device, the object disturbs electric field lines between the periodic waveform generator and receptor electrodes. A sensing circuit can detect this distortion as user input.

Touch-sensitive devices are convenient in that a wide variety of "virtual" keypad configurations can be presented to a user. Touch-sensitive devices have physical limitations due to the width of a user's finger, which can be wider than the various touch-sensitive targets presented on the touch-sensitive device. Accordingly, the granularity with which small objects can be selected can be limited by the surface area of the user's finger. Said differently, a user will find it difficult to accurately select "touchable objects" on a touch-sensitive device must that are spaced closer than, or have a size smaller than, the size of a fingertip.

It would be desirable to create alternate ways of interfacing with touch-sensitive devices, where the alternate ways allow for finer granularity of selection, thereby enhancing the user experience.

Figure 1:
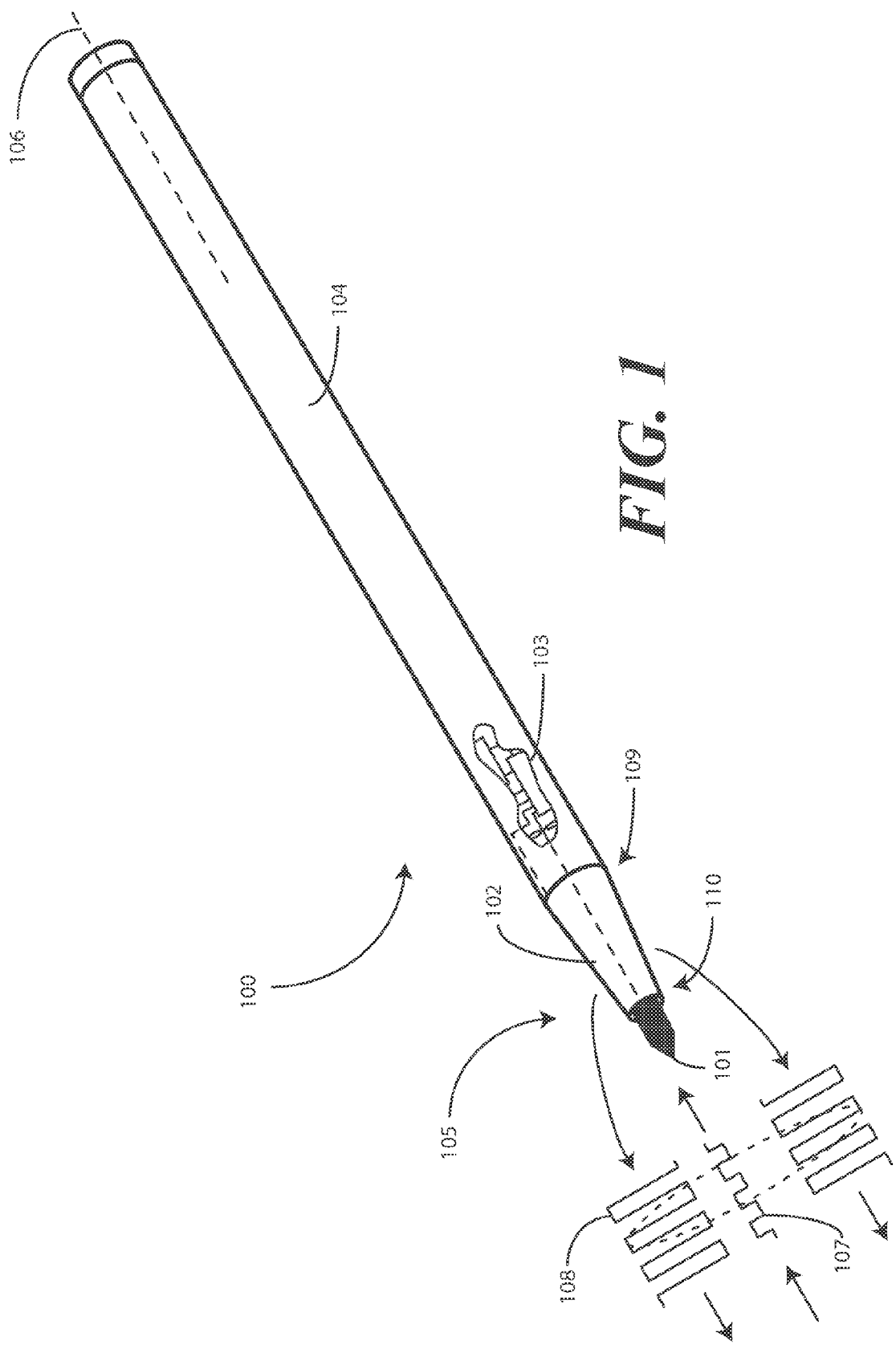
FIG. 1 illustrates one embodiment of an active stylus configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Embodiments of the present invention provide an active stylus configured for interaction with a touch-sensitive interface such as an interface employing a capacitive touch sensor. The term "active" is used herein to refer to circuit components within the stylus that are powered by an electrical energy source, such as a battery or other power supply. Examples of active components include integrated circuits, operational amplifiers, comparators, buffers, inverters, and the like. This contrasts with "passive" components that do not require an energy source, examples of which include capacitors, resistors, inductors, and transmission lines.

The active styluses described herein include an active circuit and one or more electrodes. For example, a center electrode and a shroud electrode, disposed concentrically about the center electrode, are operable with an active circuit to "inject" charge into sensors disposed within a touch-sensitive display. The injection of charge works to increase, or in some complementary embodiments decrease, the effective capacitance presented to a capacitively-enabled touch-sensitive device.

Embodiments of the invention create an adjustable capacitive-coupling through the injection of electrical charge into the touch-sensitive interface. As noted above, most capacitive touch-sensitive systems work by emitting a periodic wave that establishes electrical field lines between transmission electrodes and reception electrodes. In one embodiment, a stylus configured in accordance with embodiments of the present invention has a center electrode that can detect the emitted periodic wave. An active circuit disposed within the stylus applies a gain, which can be positive or negative, to the detected signal and causes the shroud electrode of the stylus to change potential synchronously with the received signal so as to inject charge into the touch-sensitive display. As will be shown below, the injection of charge creates a much stronger signal in the touch-sensitive device, which is easier to detect. While capacitive touch-sensitive systems will be used as an illustrative embodiment in describing one or more embodiments, it will be clear to those of ordinary skill in the art having the benefit of this disclosure that the methods, devices, techniques, and circuits described herein can be adapted to work with other types of touch-sensitive devices without departing from the spirit and scope of this disclosure.

The electrodes of styluses described herein are configured to inject charge through a Miller capacitance created between the electrodes and the touch-sensitive device. Miller capacitance can be undesirable in some active circuits, in that it can compromise gain. However, when used in accordance with embodiments of the present invention, it works to increase (or in complementary embodiments decrease) the capacitive coupling between the stylus and the touch-sensitive display.

FIG. 1 illustrates one illustrative stylus 100 configured in accordance with embodiments described herein. The stylus 100 includes a stylus body 104 and a compound tip 105. In one embodiment, the compound tip 105 extends axially 106 outward from the stylus body 104. The compound tip 105 includes a center electrode 101 and a shroud electrode 102. In the illustrative embodiment of FIG. 1, the shroud electrode 102 is disposed concentrically about the center electrode 101. In this illustrative embodiment, the shroud electrode 102 is electrically isolated from the center electrode. For example, a dielectric material may be disposed between the shroud electrode 102 and the center electrode 101. Alternatively, the mechanical configuration of the compound tip 105 can be configured such that an air gap exists between the shroud electrode 102 and the center electrode 101.

In one embodiment, the shroud electrode 102 is configured geometrically to be conical. For example, in the illustrative embodiment of FIG. 1, the shroud electrode 102 is conical in shape with a broader portion 109 being proximately located with the stylus body 104. A narrower portion 110 of the conical shape being disposed distally located from the stylus body 104. As will be shown in the discussion of FIG. 3, the use of a conical shape can be advantageous in that a conically shaped shroud electrode can deliver a linear slant detection indication to the touch-sensitive device.

The illustrative stylus 100 of FIG. 1 is an "active" stylus in that it includes an active circuit 103. The circuit is "active" because it is powered by an energy source (not shown). Examples of suitable energy sources include batteries, super capacitors, solar panels, charge harvesting circuits, and so forth. In one embodiment, the active circuit 103 is coupled between the center electrode 101 and the shroud electrode 102.

The center electrode 101 is configured to detect electric field variations 107. For example, when the center electrode 101 is disposed near a touch-sensitive device that emits a periodic wave to detect touch, the center electrode 101 can be configured to detect the electric field variations 107 emanating from the touch-sensitive surface.

The active circuit 103 is configured to apply a gain to the detected electric field variations 107. In one embodiment, the gain is set to be greater than one. In one embodiment, the gain is negative and greater than one such that an inversion occurs. It will be clear to those of ordinary skill in the art having the benefit of this disclosure that the gain can be configured in a variety of ways. For example, it may be inverting, non-inverting, amplifying, non-amplifying, and so forth.

Upon applying the gain, the active circuit 103 is configured to change the potential of the shroud electrode 102 relative to a common node. In one embodiment, the potential change occurs synchronously with the detected electric field variations 107 such that the compound tip 105 emits corresponding electric field variations 108. When used in conjunction with a touch-sensitive device, the active circuit 103 enhances the effective capacitance presented by the center electrode 101 to the touch-sensitive device. Accordingly, the center electrode 101 can be configured with a finely pointed tip while still delivering a suitable detection signal to the touch-sensitive device.

The embodiment shown in FIG. 1 can be manufactured using low-cost circuitry. For example, in one embodiment, the active circuit 103 uses only one active logic gate integrated circuit and a small number of passive components. Further, the configuration of the compound tip 105 shown in FIG. 1 offers advantages in that it works to reduce noise detected by the center electrode 101 while also increasing the magnitude of the signal injected into the touch-sensitive device.

Figure 2:
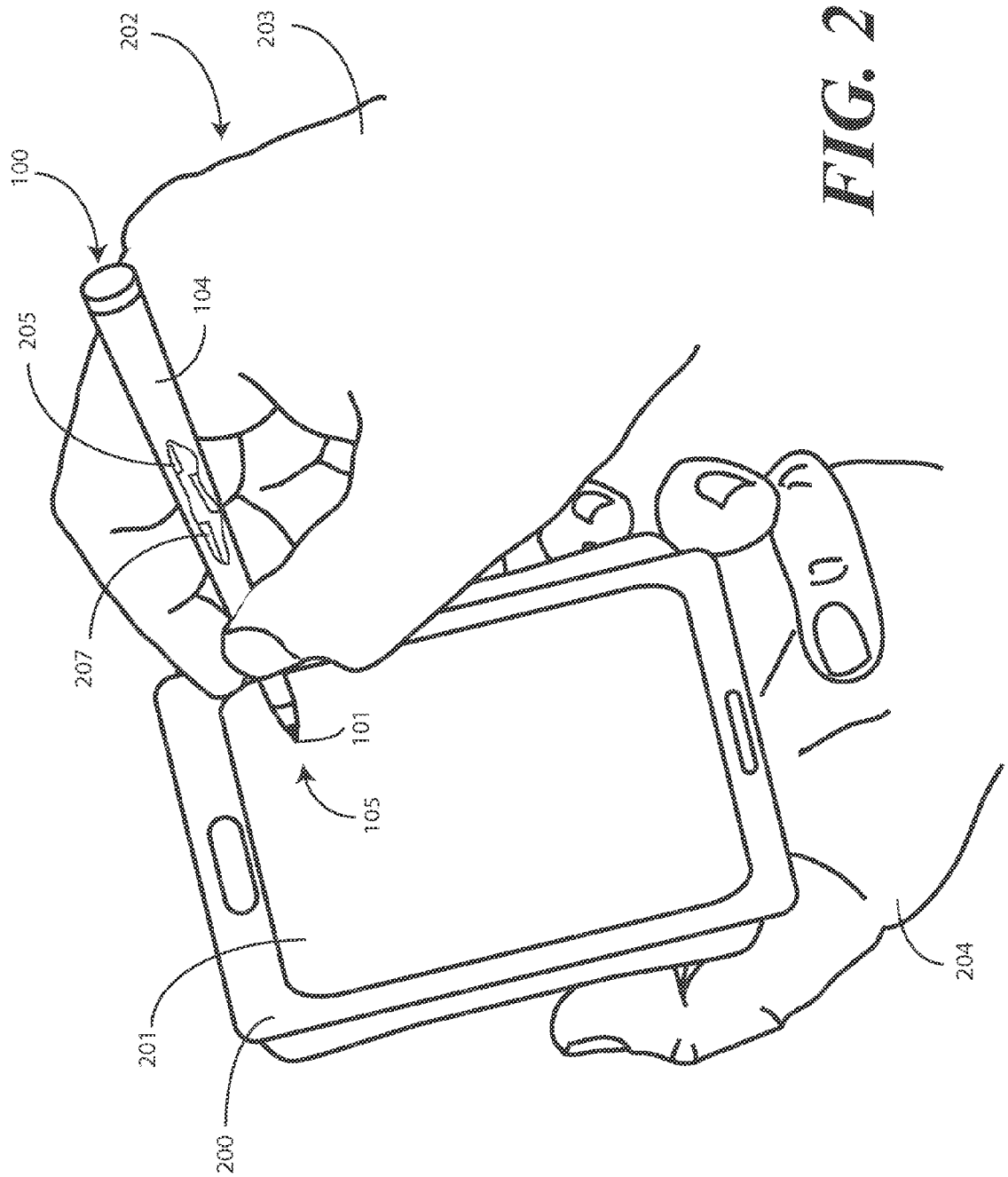
FIG. 2 illustrates one active stylus interacting with an electronic device having a touch-sensitive interface in accordance with one or more embodiments of the invention.

FIG. 2 illustrates the stylus 100 of FIG. 1 being used with an electronic device 200 that includes a touch-sensitive interface 201. The illustrative touch-sensitive user interface 201 of FIG. 2 is a capacitive touch-sensitive user interface, although other technologies may be used. Capacitive touch-sensitive devices include a plurality of capacitive sensors, e.g., electrodes, which are disposed along a substrate. Each capacitive sensor is configured, in conjunction with associated control circuitry, to detect an object in close proximity with—or touching—the surface of the electronic device 200 by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

A user 202 provides an electrical return path between the stylus 100 and the electronic device 200 as follows: Both the stylus 100 and electronic device 200 are capacitively coupled to the user 202 through the user's hands 203, 204. The user 202 is also capacitively coupled to earth ground. This capacitive return to earth ground provides a reference point from which the compound tip 105 can inject charge into the touch-sensitive interface 201. While a user 202 is shown holding the stylus 100 in FIG. 2, this need not be the case for the stylus 100 to work. Said differently, the stylus 100 also works when the electronic device 200 is somewhere other than in the user's hand 204. For example, if the electronic device 200 were sitting on a non-conductive surface such as a wooden table rather than being in the user's hand 204, even though there is no direct return path to earth ground through the user's hand 204 and body, the table and surrounding environment would still provide sufficient coupling to earth ground for the stylus 100 to work.

In the configuration shown in FIG. 2, the compound tip 105 "sniffs" the electric field variations emitted from the touch-sensitive interface 201 through the center electrode 101. The active circuit (103) then applies the gain, which in one embodiment is inverting and amplifying, and injects charge into the touch-sensitive interface 201 to alter the capacitance formed between the touch-sensitive interface 201 and the compound tip 105. An advantage offered by the stylus 100 is that the electronic device 200 need not be configured with special software or application specific hardware components to detect the stylus's compound tip 105. The Miller capacitance formed between the compound tip 105 and the touch-sensitive interface 201 works to increase the capacitive coupling between a signal source embedded within the electronic device 200 and the dynamic node of the compound tip 105.

In one embodiment, the stylus 100 is configured with an energy harvesting circuit 205. Since the power required to run the active circuit (103) is relatively small, in a stylus having advanced power management the energy harvesting circuit 205 can be configured to draw power from the received electric field variations by way of capacitive coupling circuitry. In another embodiment, where the stylus 100 includes a battery, the energy harvesting circuit 205 can be configured to periodically charge the battery, thereby extending its operable life. Alternate methods of harvesting energy use a mechanical strain component between the center electrode 101 and the stylus body 104, or use a heat sensor configured to absorb heat from the user's hand 203. In yet another embodiment, the stylus 100 can be configured with a micro-USB connector for harvesting power.

In one or more embodiments, the compound tip 105 is configured with a sensor, such as an optical sensor, mechanical sensor, or switch. The sensor can be configured to detect when the center electrode 101 comes directly in contact with, or very close to, the touch-sensitive interface 201. In one or more embodiments, the sensor can be used to actuate the active circuit (103) when the sensor detects that the center electrode 101 is close to or directly in contact with the touch-sensitive interface 201. Further, the sensor can be used to deactivate the active circuit (103) when, or after, the stylus 100 is removed from the electronic device 200.

In one embodiment, the stylus 100 is configured to perform "intentional hovering." For example, in one embodiment the stylus body 104 includes a button. The user 202 can press the button, thereby causing the stylus 100 to enter a unique internal mode. In the unique internal mode, the center electrode 101 can become more sensitive. However, in this mode the active circuit (103) can be configured to only inject charge on signals detected by the center electrode 101 that exceed a predetermined threshold. The active circuit (103) can be configured to do this when configured as in a peak-detection mode, for example. This unique internal mode would enable "icon hoist" operability that allows the user 202 to "grab" an icon presented on the touch-sensitive interface 201 by pressing the button. The user 202 could then "lift and tow" the icon by lifting the compound tip 105 slightly from the touch-sensitive interface 201 and moving the compound tip 105 to another part of the touch-sensitive interface 201. The user 202 could then "drop" the icon by releasing the button on the stylus body 104.

In yet another embodiment, the stylus 100 includes a communication circuit 207 configured for communicating with a corresponding communication circuit disposed within the electronic device 200. Examples of suitable communication circuits include Bluetooth, infrared, magnetic field modulation, and Wi-Fi circuits.

The ability for the stylus 100 to communicate with the electronic device 200 enables the stylus 100 to obtain real-time phase information for scanning purposes. Rather than this information being detected by the compound tip 105, it can be obtained from the communication circuit 207. Where the communication circuit 207 is included, the communication circuit 207 provides dual-mode functionality in that one function of the stylus 100 can be initiated with charge injection from the compound tip 105, while another is initiated by the communication circuit 207.

Figure 3:
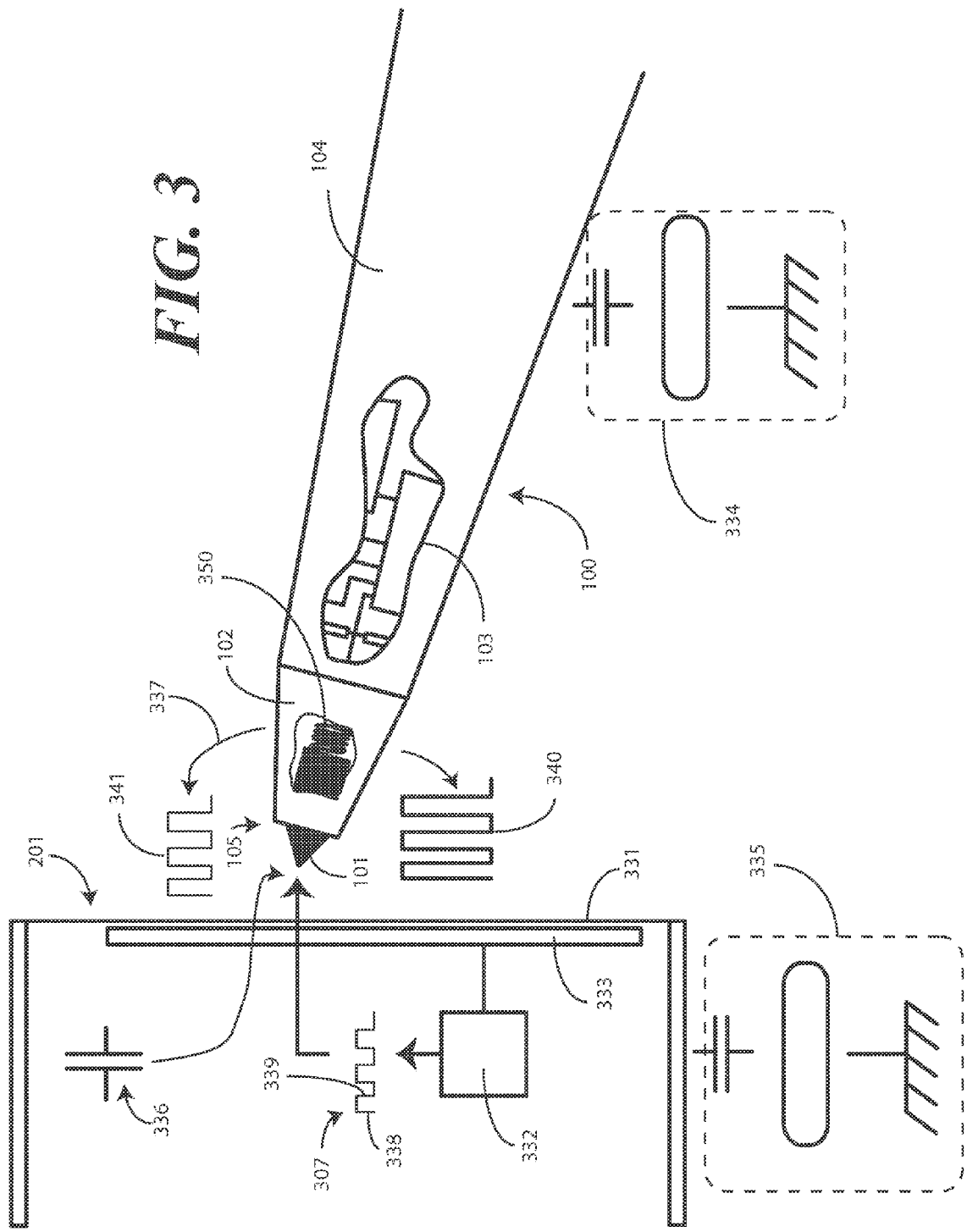
FIG. 3 illustrates one active stylus configured in accordance with one or more embodiments of the invention interacting with a touch-sensitive interface.

FIG. 3 illustrates a sectional view of one embodiment of the stylus 100 interacting with one embodiment of a touch-sensitive interface 201. The touch-sensitive interface 201 includes a touch-sensitive surface 331. A signal generator 332 generates a periodic waveform 307, which can be a square wave, sine wave, triangle wave, or other periodic waveform. The periodic waveform 307 establishes an electric field between the signal generator 332 and an array 333 of receive electrodes. Circuits 334 and 335 represent the capacitive coupling to earth ground provided by the user's hands (203,204).

When the compound tip 105 of the stylus 100 is brought into close proximity with the touch sensitive surface 331, a Miller capacitance 336 is formed between the compound tip 105 and the touch-sensitive interface 201. The center electrode 101, which works here as a receive electrode, detects the electric field variations 307. The active circuit 103 then applies gain to the detected field variations and injects 337 charge into the touch sensitive interface 201 by varying a potential of the concentrically aligned shroud electrode 102, which works here as a transmit electrode. In one embodiment, the injection of charge occurs synchronously with the electric field variations detected by the receive electrode of the compound tip 105.

In the illustrative embodiment of FIG. 3, the periodic waveform 307 comprises positive transitions 338 and negative transitions 339 that establish electric field variations between electric the signal generator 332 and the array 333 of receive electrodes. The active circuit 103 can be configured to respond to these transitions in a variety of ways. For example, the active circuit 103 can be configured to inject 337 charge only on a predetermined sequence of transitions. In one embodiment, the active circuit 103 is configured to inject 337 charge only on the positive transitions 338. In another embodiment, the active circuit 103 is configured to inject 337 charge only on negative transitions 339. In another embodiment, the active circuit 103 is configured to inject 337 charge only on every other positive transition 338. Other configurations will be obvious to those of ordinary skill in the art having the benefit of this disclosure.

Different responses to the electric field variations 307 can be used to modify the charge injection so that the stylus 100 responds to some events while ignoring others. For instance, one implementation might inject negative charge after detecting a rising edge, and then to inject negative charge after detecting the immediately following falling edge. Upon the next pair of rising and falling edges occurring, the compound tip 105 could be configured not to inject charge. In this way, the touch-sensitive interface 201 can distinguish the stylus 100 from a user's finger.

In one embodiment, the stylus 100 is configured with an optional force sensor 350. By changing the impedance of the electrical pathway between the active circuit 103 and either one or both of the center electrode 101 and shroud electrode 102 in response to force, it is possible to change the magnitude of the capacitive coupling by a corresponding amount.

In the illustrative embodiment of FIG. 3, the force sensor 350 is shown as a mechanical force sensor, such as a spring, disposed between the center electrode 101 and the stylus body 104. The force sensor 350 can be used to activate the active circuit 103 when the center electrode 101 is in contact with the touch-sensitive surface 331. In another embodiment, the active circuit can use output information from the force sensor 350 to alter the magnitude of the injected charge as a function of forces detected by the force sensor 350. Accordingly, a user may be able to draw darker lines, for example, by applying more pressure.

It will be clear to those of ordinary skill in the art having the benefit of this disclosure that other sensors could be used with, or substituted for, the force sensor 350. Examples of these sensors include a switch, communication circuit, or optical sensor. Additionally, piezoresistive elements may be disposed between the stylus body 104 and the center electrode 101. In any of these embodiments, the force sensor 350 enables the stylus 100 to deliver a varying capacitance based upon detected, applied force. This capability is well suited for applications such as signature recognition, in which user-applied force is a measurable biometric.

In one embodiment, the stylus 100 is configured to deliver a slant detection indication to the touch sensitive interface 201. This is best illustrated by way of example. As shown in FIG. 3, the stylus 100 extends from the touch-sensitive surface 331 at a downward angle. At the same time, the shroud electrode 102 has a conical shape. When the active circuit 103 injects 337 charge, the lower side of the shroud electrode 102 is closer to the touch sensitive surface 331 than the upper side. Consequently, the charge 340 injected by the lower side is greater than the charge 341 injected by the upper side. The array 333 of sense electrodes within the touch-sensitive interface 201 can be configured to interpret this as a slant detection indication, and can use this information in manipulation of objects presented on the touch-sensitive interface 201. The conical shape of the shroud electrode 102 ensures that the slant detection indication is linearly increasing as the stylus 100 is further inclined.

Figure 4:
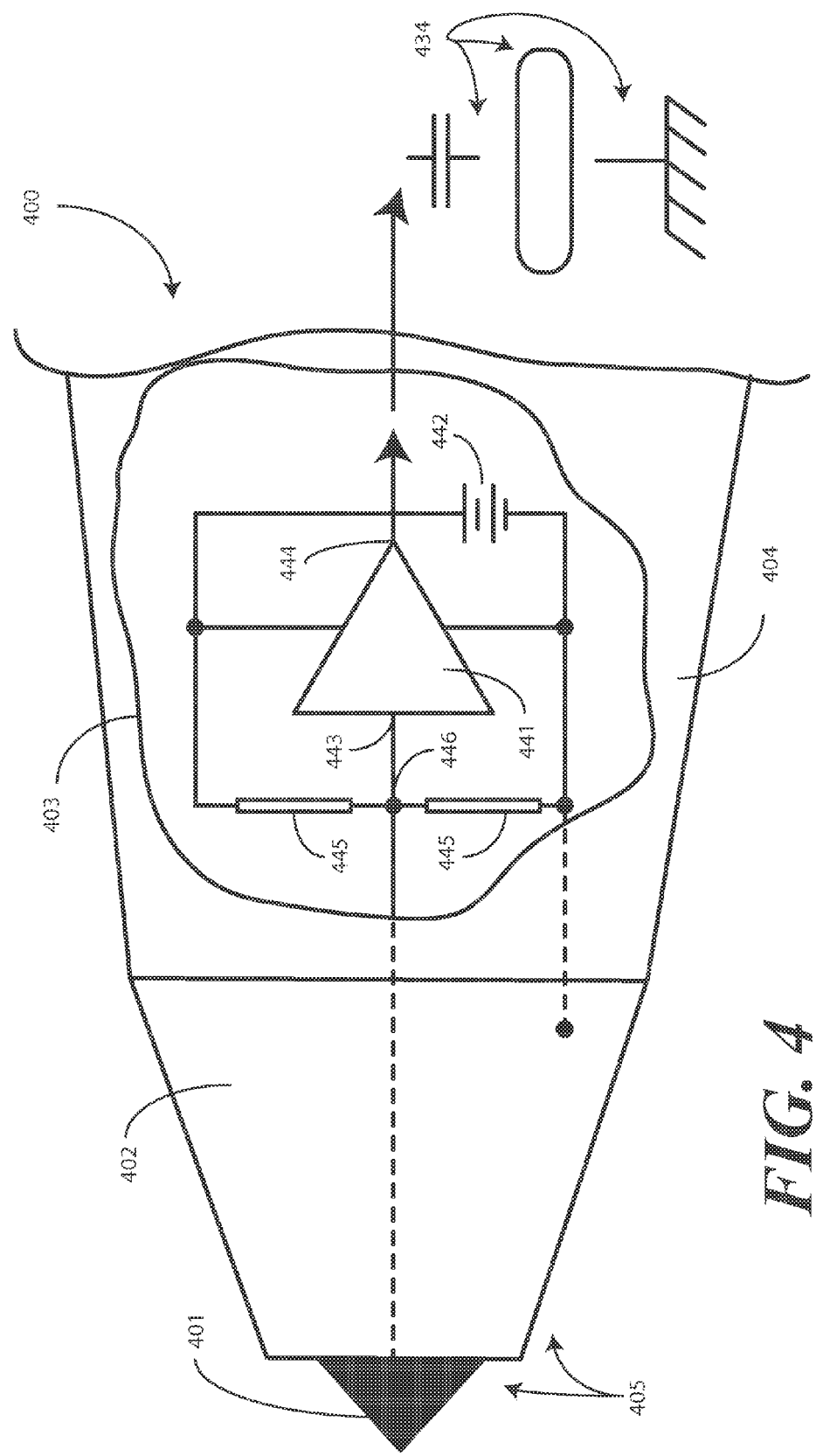
FIG. 4 illustrates a schematic block diagram of one active circuit suitable for use in a stylus configured in accordance with one or more embodiments of the invention.

FIG. 4 illustrates a schematic block diagram of one illustrative active circuit 403 configured in accordance with one or more embodiments of the invention. As shown in FIG. 4, the active circuit 403 comprises a buffer 441 powered by a voltage source 442. The buffer 441 has an input 443 that is coupled to the center electrode 401. An output 444 of the buffer 441 is coupled to the shroud electrode 402. In the illustrative embodiment of FIG. 4, the gain of the buffer 441 is negative such that rising edges detected by the center electrode 401 corresponds to negative charge injection by the shroud electrode 402.

A voltage divider 445 is coupled across the voltage source 442, with a central node 446 of the voltage divider 445 coupled to the input 443 of the buffer 441. In one embodiment, the voltage divider 445 is configured such that the potential established at the central node 446 is set at a transition-threshold level of the buffer 441. This transition-threshold level is the voltage at which the output 444 toggles from an active high state to an active low state or vice-versa. In one embodiment, the output 444 of the buffer 441 is coupled to the stylus body. In this embodiment, circuit 434 represents the coupling of the stylus body 404 to earth ground by way of the user's hand (203).

When the center electrode 401 detects a rising (positive) edge (338) or a falling (negative) edge (339) from the touch-sensitive interface (201), the buffer 441 toggles and changes the potential of the shroud electrode 402. In the configuration of FIG. 4, negative charge is injected into the touch-sensitive interface (201) when a rising (or positive-going) edge is detected by the center electrode 401. Likewise, positive charge is injected into the touch-sensitive interface (201) when a falling (or negative-going) edge is detected by the center electrode 401. This "bang-bang" action on rising and falling edges enhances the capacitive coupling between the compound tip 405 and the touch-sensitive interface (201).

Figure 5:
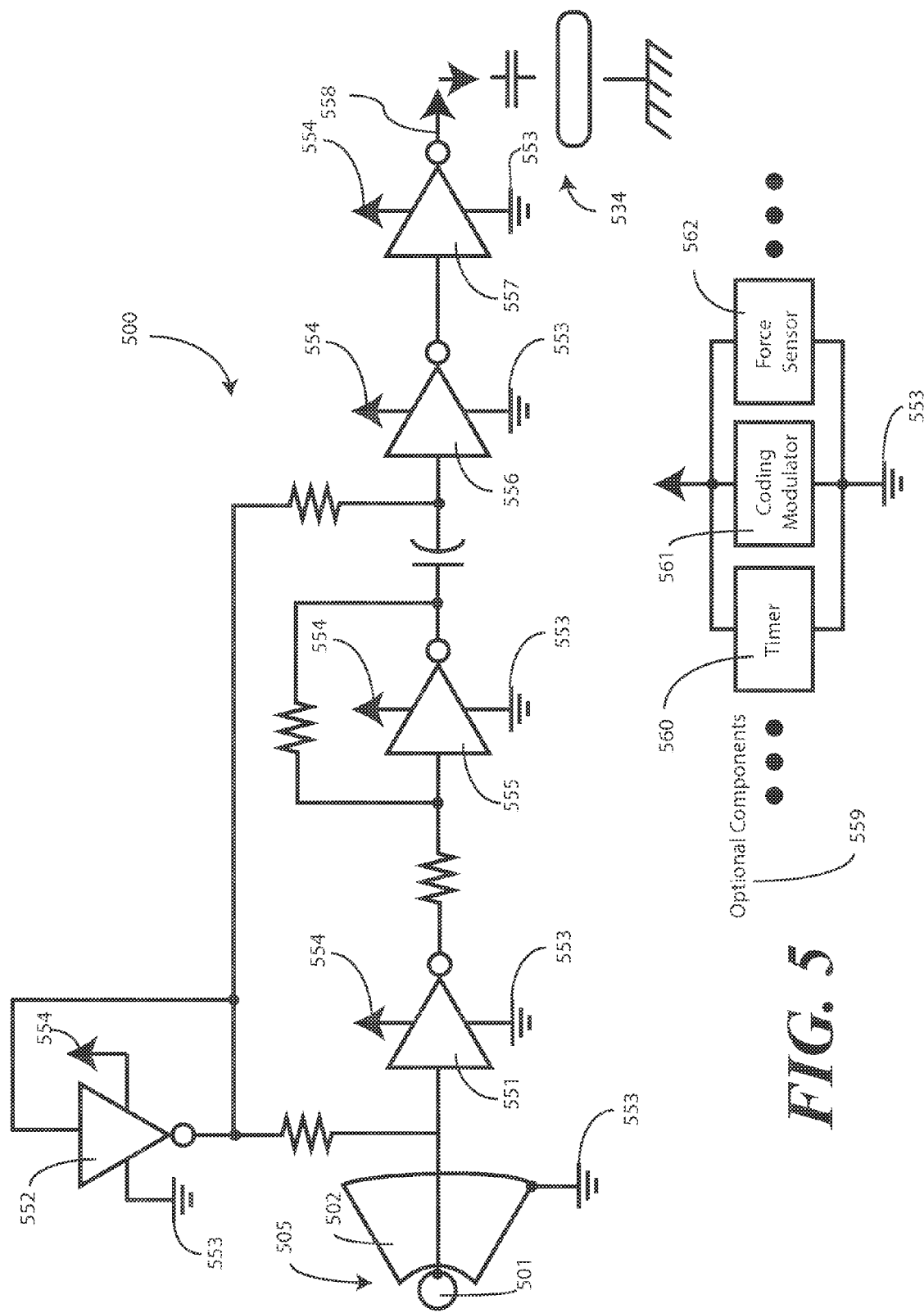
FIG. 5 illustrates another schematic diagram of an active circuit and corresponding electrodes configured in accordance with embodiments of the invention.

FIG. 5 illustrates one exemplary schematic diagram 500 suitable for implementing the block diagram of FIG. 4. It will be clear to those of ordinary skill in the art having the benefit of this disclosure that any number of circuits can be created to execute the steps of receiving a signal from a touch-sensitive interface (201) and injecting (337) charge synchronously back into (or sinking charge out of) the touch-sensitive interface (201) after applying a predetermined gain. The schematic diagram 500 of FIG. 5 is but one realization, and is not intended to be limiting.

The circuit of FIG. 5 employs a hex-buffer integrated circuit that includes six buffer/converters (inverters). One example of such a buffer is the MC74HCU04A Hex Unbuffered Inverter manufactured by ON Semiconductor. Another is the M54HC4049 RAD-Hard Hex Buffer/Converter manufactured by ST Microelectronics. Other similar hex-buffers are manufactured by Fairchild Semiconductor, Toshiba Semiconductor, and R&E International.

The first electrode 501 is coupled to a first inverter 551. A second inverter 552, also coupled to the input of the first inverter 551, is biased at the toggle voltage of the first inverter 551. This configuration allows the first inverter 551 to toggle from an active low state to an active high state, or vice versa, in response to very small signals that the first electrode 501 receives. The periodic waveform (307) emitted by touch-sensitive interfaces (201) are generally periodic waves with frequencies of between 100 kHz and 200 kHz. The amplitude of such signals, which are capacitively-coupled through the touch-sensitive interface (201) to an electronic circuit, is often on the order of 50 mV. Accordingly, biasing the second inverter 552 at the "trip point" of the first inverter 551 can be advantageous in ensuring that the first inverter 551 toggles when the first electrode 501 receives these high frequency, small magnitude signals.

The shroud electrode 502 is coupled to a common node 553 of the circuit. This common node 553, sometimes referred to as a "local return," is the node to which the voltage source 554 is referenced. As shown in FIG. 5, each of the buffers 551,552 is accordingly coupled both to the voltage source 554 and the common node 553.

The shroud electrode 502 performs two functions. First, it provides a reference against which the potential difference between the center electrode 501 and the shroud electrode 502 can be "yanked around" by the buffers to inject (337) charge into the touch-sensitive interface (201). Second, it shields the first electrode 501 from external noise sources.

The series string of inverters 551,555,556,557 provide a circuit equivalent to the buffer (441) shown in FIG. 4. The first electrode 501 is the input of the series string, and the output 558 is coupled to the stylus body (404) and then through circuit 534 to earth ground by way of the user's hand (203). This series string "clamps" the output to the rails provided by the voltage source 554 and the common node 553. Whether the output 558 of the series string is active high or active low will depend upon whether the first electrode 501 is detecting a falling edge or a rising edge.

When the first electrode 501 senses a rising edge, the first inverter 551 toggles. This causes the output 558 to be pulled active high. Since a user (202) is holding the stylus body (404) with his hand (203) the common node 553 is pulled down by way of circuit 534. To the touch-sensitive interface (201), this looks like a large negative edge at the shroud electrode 502. This synchronous "pulling down" of the common node 553 introduces the Miller capacitance (336) between the compound tip 505 and the touch-sensitive interface (201), and further increases the effective capacitance presented by the compound tip 505 to the touch-sensitive interface (201). In short, the effect is that the touch-sensitive interface (201) detects a touch, despite the fact that the compound tip 505 is significantly smaller than a user's finger.

In addition to the basic circuit, other optional components, shown collectively at 559, can also be included. A first optional component is a timer 560. The timer 560 can be used to power-down the circuit after a predetermined time. For example, where the voltage source 554 is a battery, it can be desirable to put the circuit into a low power or sleep mode after a predetermined period of non-use, such as 5 seconds, 15, seconds, 1 minute, and so forth. In one embodiment, the timer 560 is configured to start timing upon use and reset with each subsequent use. Accordingly, when the user (202) stops using the stylus, and the timer 560 has expired, the circuit can be placed into a low-power or sleep mode. Alternatively, the timer 560 can be configured to respond to electric field variations detected by the center electrode 501. For example, the timer 560 may be configured to place the circuit into a low power or sleep mode upon non-detections of the electric field variations at the center electrode 501 for at least a predetermined time threshold.

A second optional component is a coding modulator 561. As noted above, the injected signal can be a replication of the detected signal. Alternatively, some rising or falling edges can be ignored to provide a characteristic identifier to the touch-sensitive interface. In one embodiment, a coding modulator 561 can be included such that the circuit injects charge in accordance with a rolling code signal. A third optional component is the force sensor 562, one embodiment of which was described with reference to FIG. 3 (force sensor 350).

Because the compound tip 505 can transmit signals, in some embodiments it can further serve as a type of electronic key that transmits rolling codes. In one possible implementation employing a coding modulator 561, the circuit responds to a pair of adjacent rising and falling edges by injecting (337) a negative charge in response to the rising edge, and a positive charge in response to the falling edge, so as to indicate a binary "1." To indicate a binary "0," the coding modulator 561 can cause the circuit to ignore an adjacent rising and falling edge. In this way, the received signal functions like a "clock" signal, while the charge injection signal from the compound tip 505 serves as a "data" signal. The data signal can be used to unlock applications presented on the touch-sensitive interface (201). Further, the coding modulator 561 can be configured to function only selectively, such as when the user (202) presses a button disposed along the stylus body (404).

Figure 6:
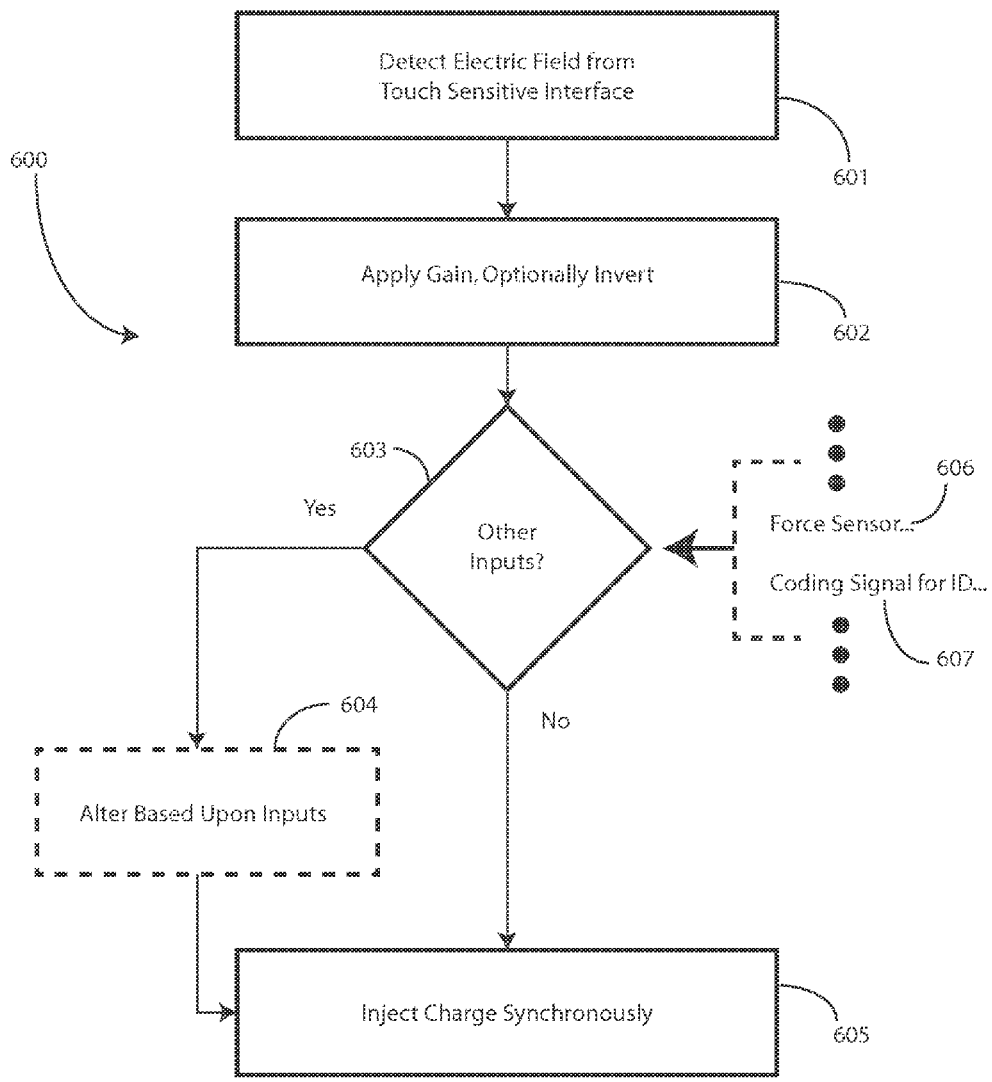
FIG. 6 illustrates a method of interacting with a touch-sensitive device in accordance with one or more embodiments of the invention.

FIG. 6 illustrates one method 600 for interacting with a touch-sensitive interface by injecting charge into (or sinking charge from) the interface in accordance with one or more embodiments of the invention. The functions of the various steps have been generally described above. Accordingly, each step will be only briefly described here.

At step 601, a receive electrode in a compound tip of a stylus detects electric field variations emitted by the touch-sensitive interface. At step 602, an active circuit applies a gain to a signal corresponding to the detected electric field variations. At step 605, a transmit electrode injects charge into, or sinks charge from, the touch-sensitive interface. In one embodiment, this step 605 occurs synchronously with the signal corresponding to the detected electric field variations. In one embodiment, the active circuit accomplishes this by altering an electric field defined between the receive electrode and the transmit electrode. In one embodiment, the active circuit first inverts the signal corresponding to the detected electric field variations with the active circuit, and then applies a gain.

As described above, other inputs can be used to alter the gain applied by the active circuit. Whether optional components providing other inputs are included is determined at decision 603. Where they are, the active circuit can alter the gain in response to these inputs at step 604. Examples of other inputs include a force signal 606 generated by a force detector operable with the compound tip and an identification code 607 from a coding modulator.

Figure 7:
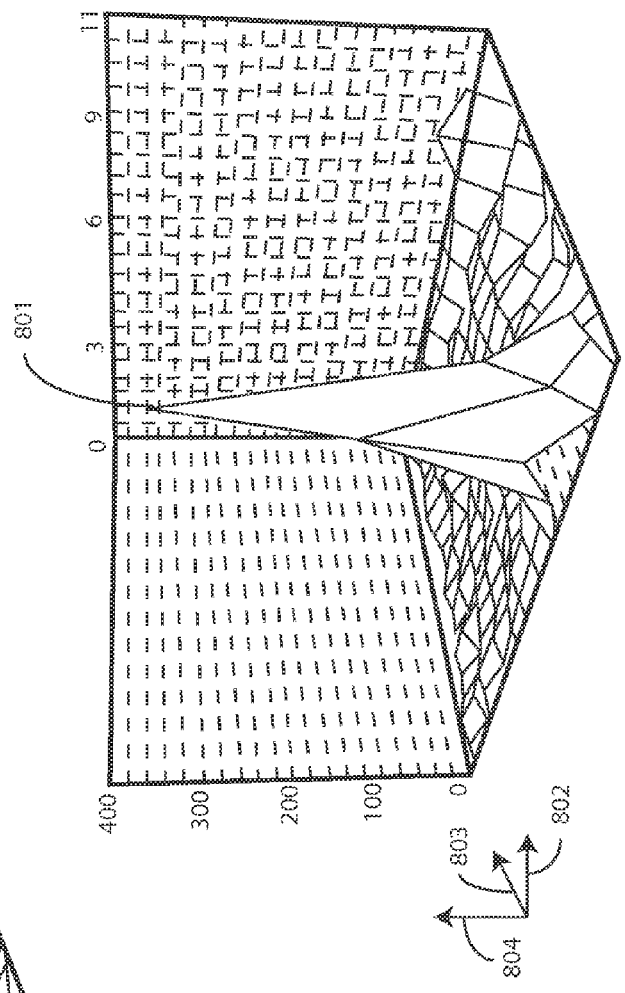
FIG. 7 illustrates a stimulus received by a touch-sensitive device from a stylus that does not include an active circuit.
Figure 8:
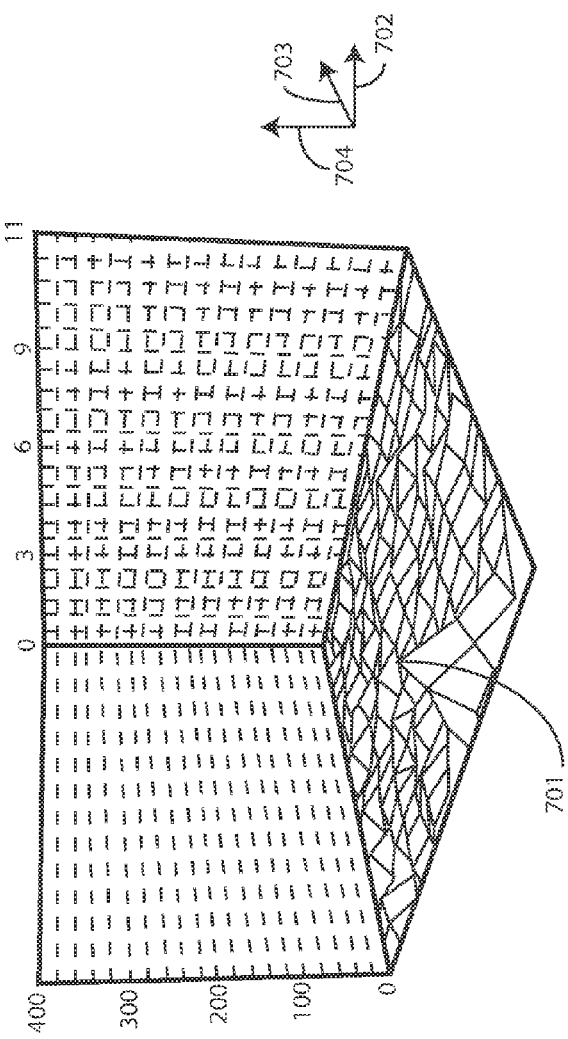
FIG. 8 illustrates a stimulus received by a touch-sensitive device from a stylus configured in accordance with one or more embodiments of the invention.

FIGS. 7 and 8 illustrate the charge detected by a stylus that does not include an active circuit coming into contact with a touch-sensitive interface, and a stylus configured in accordance with embodiments of the present invention, respectively. In each figure, horizontal axes 702,703 and 802,803 represent the planar surface area of a touch-sensitive surface, while the vertical axes 704,804 represent the magnitude of detection signals along that planar surface area.

Most prior art styluses either require advanced hardware and software in both the stylus and receiver, or are simply mechanical devices having no active circuitry. FIG. 7 shows a charge detection peak 701 of the latter, i.e., a fine-tipped stylus having no active circuit. Examples of prior art passive styluses include the Pogo Stylus manufactured by Ten-1 and the DAGi stylus manufactured by DAGi Corporation. These passive devices provide small touch-signals, similar to that shown in FIG. 7. The actual signal delivered will change some based upon the width of the stylus tip.

By contrast, the charge detection peak 801 of embodiments of the present invention is shown in FIG. 8. As shown, it is orders of magnitude higher than those presented by passive prior art styluses. Further, the compound tip of embodiments of the present invention can be configured as a finer point, such as with a 2.5-millimeter center electrode, thereby resembling a ballpoint pen.

Embodiments of the present invention employ a simple, active circuit that requires no alteration to the electronic device with which the stylus is used. Further, embodiments of the present invention work with a wide variety of touch-sensitive systems universally. No hardware or software alteration is required in the touch-sensitive system. Accordingly, embodiments of the present invention provide seamless transitions between finger-based input and stylus-based input. Further, embodiments of the present invention employ very few circuit components and can be manufactured robustly and inexpensively.

Figure 9:
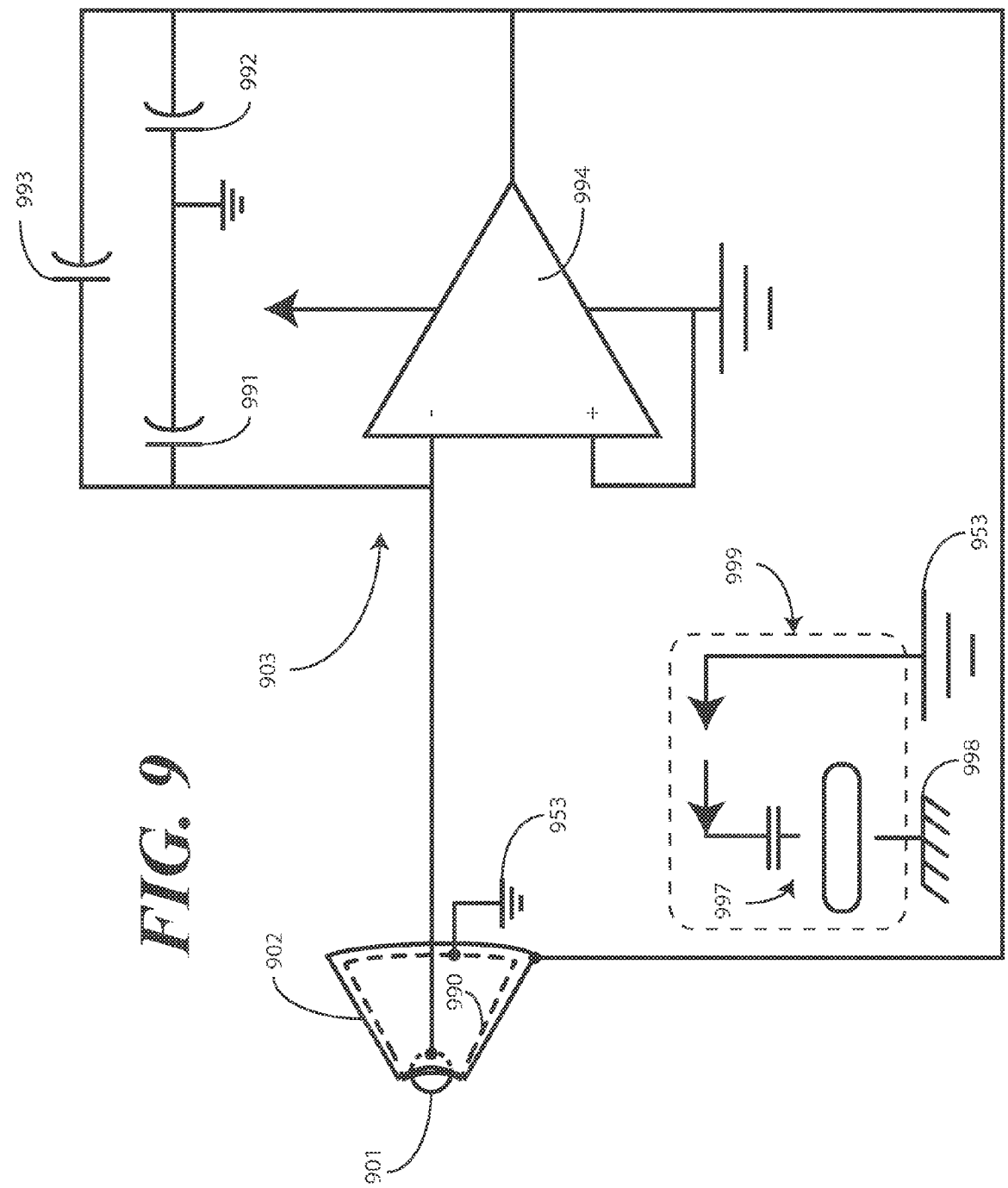
FIG. 9 illustrates a schematic diagram of an alternate active circuit configured in accordance with one or more embodiments of the invention.

FIG. 9 illustrates an alternate active circuit 903 configured in accordance with embodiments of the invention. In FIG. 9, rather than being a "bang-bang" circuit that toggles between active high and active low states, the active circuit 903 is configured as a gyrator. As is known in the art, a gyrator can be thought of as a two-port device that couples current on one port to the voltage on the other port, and vice versa. The gyrator inverts and magnifies detected signals for charge injection, and is well suited to work with continuous touch-sensitive interface detection waveforms, such as sine waves.

One feature of note in FIG. 9 that could equally be included in the other embodiments described above is the addition of a suppression shroud 990. The suppression shroud 990 is concentrically disposed about the center electrode 901 between the center electrode 901 and the shroud electrode 902. Further, in one embodiment the suppression shroud 990 is electrically isolated from each of the center electrode 901 and the shroud electrode 902. The suppression shroud 990 can be electrically coupled to the common node 953 of the active circuit 903. Circuit 999 illustrates the relationship between the common node 953 and ground 998. Specifically, capacitive coupling 997 through a user or other object provides a return path between the common node 953 and ground 998.

Some capacitive touch-sensitive systems use discontinuous waveforms to perform capacitive measurements. Such systems are susceptible to electrical noise that also contains discontinuous waveforms. Examples of electrical noise include the common-mode noise produced by a battery charger, which is frequently included in an electronic device. The suppression shroud 990 works to reduce the detection of the extraneous noise by the center electrode 901.

Another function of the suppression shroud 990 is the prevention of negative feedback occurring between the shroud electrode 902 and the center electrode 901. Such negative feedback can work to sabotage the gain applied to the received signal at the output of the active circuit 903. As such, the suppression shroud 990 can function in a manner analogous to the operation of a "screen grid" found in Tetrode and Pentode vacuum tubes. The screen grid worked to block Miller capacitance established between the control grid and the plate in these vacuum tubes.

In the embodiment of FIG. 9, three capacitors 991,992,993 of the "gyrator" define a negative feedback loop about buffer 994. For signals with amplitude that changes with time, these capacitors 991,992,993 establish gain. For example, capacitors 991,993 establish a first gain for signals of the center electrode 901 relative to the suppression shroud 990, while capacitors 992,993 define a gain for signals of the center electrode relative to the shroud electrode 902. The capacitors 991,992,993 work to invert the current-voltage characteristic of the active circuit 903, thereby causing a "one-way" reversal of signal polarity. Said differently, the capacitors 991,992, 993 cause a reversal of signal polarity for signals detected by the center electrode 901, but not for either the shroud electrode 902 or the suppression shroud 990.

Figure 10:
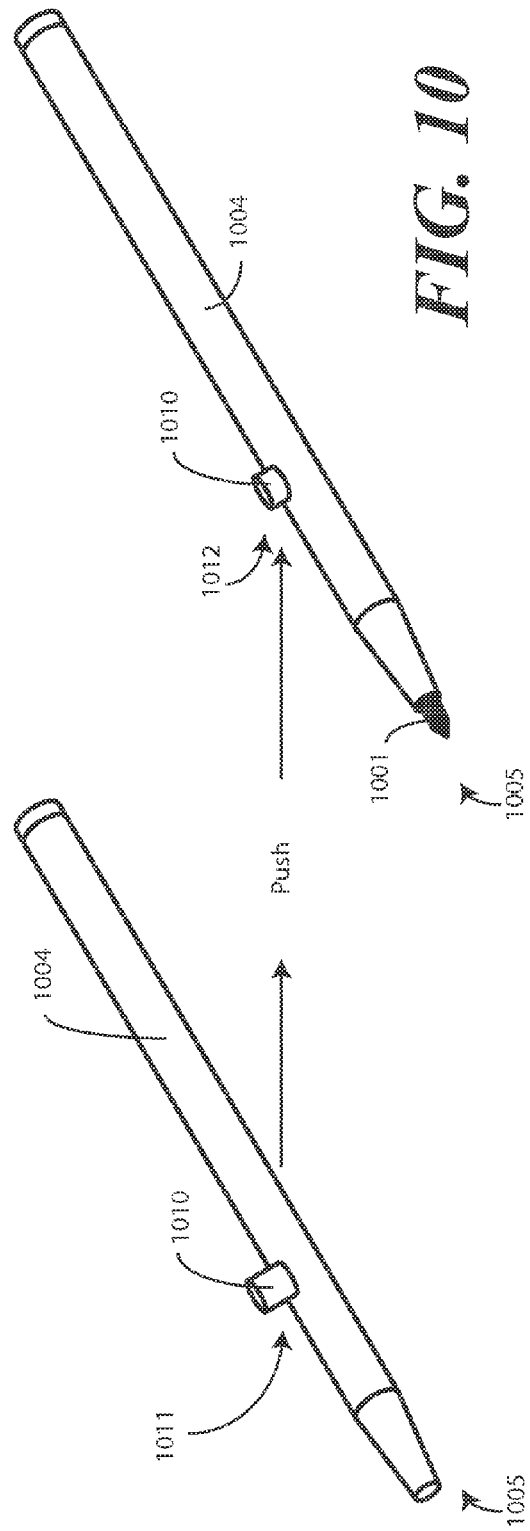
FIG. 10 illustrates one embodiment of a stylus having a retractable center electrode in accordance with one or more embodiments of the invention.
Figure 11:
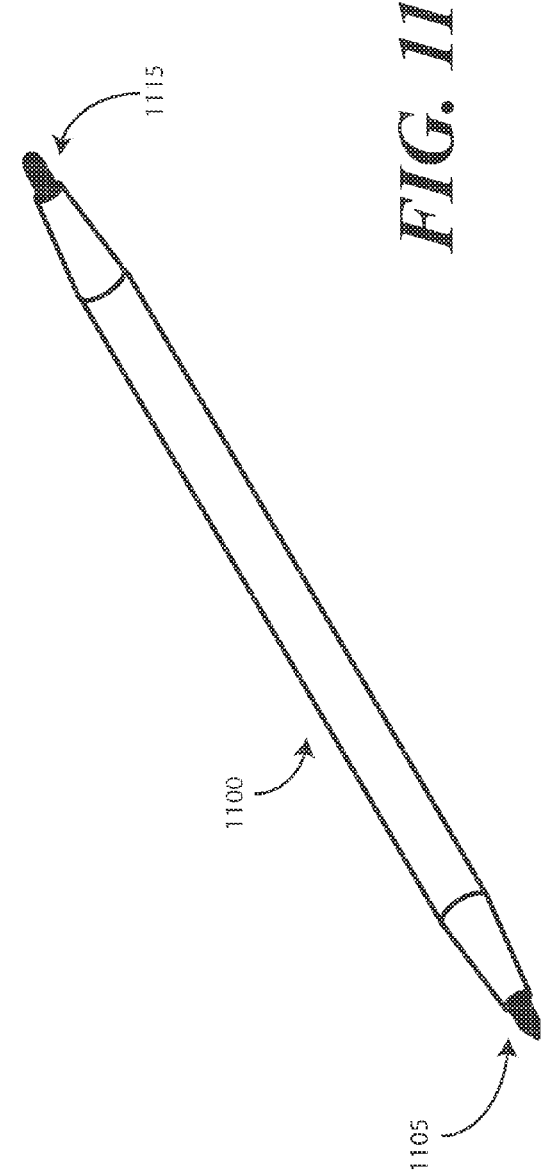
FIG. 11 illustrates a double-ended stylus configured in accordance with one or more embodiments of the invention.

FIGS. 10 and 11 illustrate optional features that can be incorporated into various embodiments of the invention. Beginning with FIG. 10, in one embodiment the compound tip 1005 can be configured to be retractable. A push-button 1010 can be provided along the stylus body 1004. The push-button 1010 functions as a mechanical retraction mechanism operable with the compound tip to selectively retract the compound tip within the stylus body 1004. Alternatively, the push-button can be configured to retract only the center electrode within the shroud electrode.

In one embodiment, when the push-button 1010 is in a first state 1011, the center electrode 1001 is retracted within the stylus body 1004. When the push-button 1010 is in a second state 1012, the center electrode 1001 extends distally from the stylus body 1004. In this configuration, the stylus resembles a ballpoint pen in that the center electrode 1001 can be extended when in use, but retracted otherwise. In one embodiment, the push-button 1010 can also be used as a power switch that disconnects the battery or other voltage source from the active circuit.

Turning to FIG. 11, illustrated therein is a stylus 1100 having compound tips 1105, 1115 at both ends. The configuration of FIG. 11 permits the second compound tip 1115 to respond differently from the first compound tip 1105. For example, if the first compound tip 1105 injects charge upon detecting a rising transition, the second compound tip 1115 may withdraw charge on rising transitions. Alternatively, while the first compound tip 1105 may respond to every transition, the second compound tip 1115 may respond to only positive transitions. Other different response schemes will be clear to those of ordinary skill in the art having the benefit of this disclosure. Where the compound tips 1105, 1115 respond differently, the touch-sensitive interface can identify the different ends of the stylus 1100. Accordingly, different features can be delivered by the different end, such as a writing tool at the first end and an eraser at the other.

The various embodiments described herein offer numerous advantages over prior art solutions. For instance, "gloved hand" operation is generally not supported by most touch-sensitive interfaces. The various styluses described herein permit gloved-hand operation. Additionally, while shown illustratively herein as a stylus, embodiments of the invention could also be configured as thimbles suitable for user wear under a glove, for incorporation into one or more fingertips of a glove, or other configurations. In any configuration, embodiments described herein increase capacitive coupling—even when the user is wearing gloves—so that the touch-sensitive interface can detect touches of the stylus.

Additionally, embodiments of the present invention provide stylus interaction that appears, to the touch-sensitive interface, as a "finger touch." In so doing, the styluses described herein can be used in conjunction with fingers to perform multi-finger gesture operations.

It should be observed that the embodiments reside primarily in combinations of method steps and apparatus components related an active stylus configured to be operable with a touch-sensitive display. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A stylus configured for actively interacting with a touch-sensitive interface, the stylus comprising:
   a stylus body; and
   a compound tip extending axially from the stylus body, the compound tip comprising:
      a center electrode configured to detect electric field variations;
      a shroud electrode electrically and mechanically isolated from and disposed concentrically around the center electrode;
      a suppression shroud, disposed between the center electrode and the shroud electrode, electrically isolated from each of the center electrode and the shroud electrode, wherein the suppression shroud is electrically coupled to a common node of the stylus; and
      an active circuit coupled between the center electrode and the shroud electrode and configured to apply a gain to the electric field variations and to change a potential of the shroud electrode with the electric field variations.

2. The stylus of claim 1, wherein the shroud electrode is conical in shape, with a broader portion being proximately located with the stylus body and a narrower portion being distally located from the stylus body.

3. The stylus of claim 1, wherein the active circuit comprises:
a gyrator having an input coupled to the center electrode and an output coupled to the shroud electrode.

4. The stylus of claim 1, further comprising:
a communication circuit, operable with the active circuit, and configured to communicate with an electronic device having the touch-sensitive interface.

5. The stylus of claim 1, wherein the active circuit comprises:
a buffer powered by a voltage source, the buffer having an input coupled to the center electrode and an output coupled to the shroud electrode.

6. The stylus of claim 5, further comprising:
a voltage divider coupled to the voltage source and having a central node coupled to the input,
wherein the voltage divider is configured such that a central-node potential is set at a threshold level of the buffer, the threshold level causing the output to toggle from one of an active high state to an active low state or the active low state to the active high state.

7. The stylus of claim 1, wherein the gain is negative.

8. The stylus of claim 1 further comprising one of a force sensor, an optical sensor, a communication circuit, or a switch, operable with the active circuit and configured to selectively actuate the active circuit.

9. The stylus of claim 1, further comprising a mechanical retraction mechanism operable with the center electrode and configured to selectively retract the center electrode within the stylus body.

10. The stylus of claim 1, further comprising a timer operable with the active circuit and configured to place the active circuit in a low-power mode upon non-detections of the electric field variations for at least a predetermined time threshold.

11. The stylus of claim 1, further comprising a second compound tip extending axially from the stylus body at a distal end from the compound tip.

12. A stylus for active interaction with a touch-sensitive interface, comprising:
a compound tip having concentrically aligned transmit and receive electrodes configured to produce a Miller capacitance between the compound tip and the touch-sensitive interface and a suppression shroud, disposed between the transmit and receive electrodes, electrically coupled to a common node of the stylus; and
an active circuit configured to apply a gain to electric field variations detected by the receive electrode and inject charge into the touch-sensitive interface synchronously with electric field variations detected by the receive electrode of the compound tip.

13. The stylus of claim 12, wherein the electric field variations detected by the receive electrode of the compound tip comprise positive transitions and negative transitions, wherein the active circuit is configured to inject the charge only on a predetermined sequence of positive transitions, negative transitions, or combinations thereof 14. The stylus of claim 12, wherein the active circuit is configured to invert and amplify the electric field variations detected by the receive electrode of the compound tip.

15. The stylus of claim 12, wherein the transmit electrode is geometrically configured to deliver a slant detection indication to the touch-sensitive interface.

16. The stylus of claim 12, wherein the compound tip comprises a force sensor, wherein the active circuit is configured to alter a magnitude of the charge as a function of forces detected by the force sensor.

17. The stylus of claim 12, wherein the active circuit is configured to inject the charge in accordance with a rolling code signal.

18. In a stylus, a method for interacting with a touch-sensitive user interface, comprising:
detecting electric field variations with a receive electrode of a compound tip of the stylus;
applying a gain with an active circuit to a signal corresponding to the electric field variations;
suppressing negative feedback between the receive electrode and a transmit electrode of the compound tip; and
injecting charge from the transmit electrode, synchronously with the signal corresponding to the electric field variations, by altering an electric field defined between the receive electrode and the transmit electrode, wherein the transmit electrode is electrically and mechanically isolated from the receive electrode and is disposed concentrically around the receive electrode.

19. The method of claim 18, further comprising one or more of the following:
inverting the signal corresponding to the electric field variations with the active circuit;
altering the gain in response to a force signal generated by a force detector operable with the compound tip; or
altering the signal corresponding to the electric field variations with an identification code.

* * * * *